(12) United States Patent
Suciu et al.

(10) Patent No.: US 9,989,011 B2
(45) Date of Patent: Jun. 5, 2018

(54) REVERSE FLOW SINGLE SPOOL CORE GAS TURBINE ENGINE

(71) Applicant: United Technologies Corporation, Hartford, CT (US)

(72) Inventors: Gabriel L. Suciu, Glastonbury, CT (US); Jesse M. Chandler, East Hartford, CT (US); Daniel Bernard Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 836 days.

(21) Appl. No.: 14/639,164

(22) Filed: Mar. 5, 2015

(65) Prior Publication Data

US 2016/0102634 A1      Apr. 14, 2016

Related U.S. Application Data

(60) Provisional application No. 61/979,552, filed on Apr. 15, 2014.

(51) Int. Cl.
| | |
|---|---|
| *F02K 3/06* | (2006.01) |
| *F02K 3/04* | (2006.01) |
| *F02C 3/06* | (2006.01) |
| *F02K 3/02* | (2006.01) |
| *F01D 13/00* | (2006.01) |

(Continued)

(52) U.S. Cl.
CPC .............. *F02K 3/04* (2013.01); *F01D 13/003* (2013.01); *F01D 13/006* (2013.01); *F02C 3/06* (2013.01); *F02C 7/36* (2013.01); *F02K 1/52* (2013.01); *F02K 3/025* (2013.01); *F02K 3/06* (2013.01); *F05D 2220/323* (2013.01); *F05D 2250/314* (2013.01); *F05D 2260/4031* (2013.01)

(58) Field of Classification Search
CPC .......... F02K 3/06; F02K 3/025; F01D 13/003; F05D 2250/314
See application file for complete search history.

(56) References Cited

U.S. PATENT DOCUMENTS

| | | | |
|---|---|---|---|
| 5,103,635 A | * | 4/1992 | Lardellier .............. F02C 3/067 415/79 |
| 2007/0022758 A1 | | 2/2007 | Myers et al. |
| 2007/0245710 A1 | | 10/2007 | Schumacher et al. |

(Continued)

*Primary Examiner* — Pascal M Bui Pho
*Assistant Examiner* — Marc Amar
(74) *Attorney, Agent, or Firm* — Carlson, Gaskey & Olds, PC

(57) ABSTRACT

A bypass housing receives a fan and defines a front end. An airflow path delivers air into an inlet duct over a limited circumferential extent of the bypass housing. An airflow path passes across a low pressure compressor rotor. An airflow path passes through a core engine, which includes a high pressure compressor rotor, a combustor, and a high pressure turbine rotor. Products of combustion downstream of the high pressure turbine rotor pass into an intermediate duct and then across a low pressure turbine rotor. The low pressure turbine rotor is positioned closer to the front end of the engine than is the high pressure turbine rotor. The low pressure turbine rotor is positioned axially intermediate the low pressure compressor rotor and the fan. The low pressure turbine rotor drives both the fan and the low pressure turbine rotor. An aircraft is also disclosed.

21 Claims, 5 Drawing Sheets

(51) Int. Cl.
*F02C 7/36* (2006.01)
*F02K 1/52* (2006.01)

(56) References Cited

U.S. PATENT DOCUMENTS

2010/0050650 A1  3/2010  Patel et al.
2010/0154426 A1  6/2010  Parker
2011/0164958 A1  7/2011  Saitoh

* cited by examiner

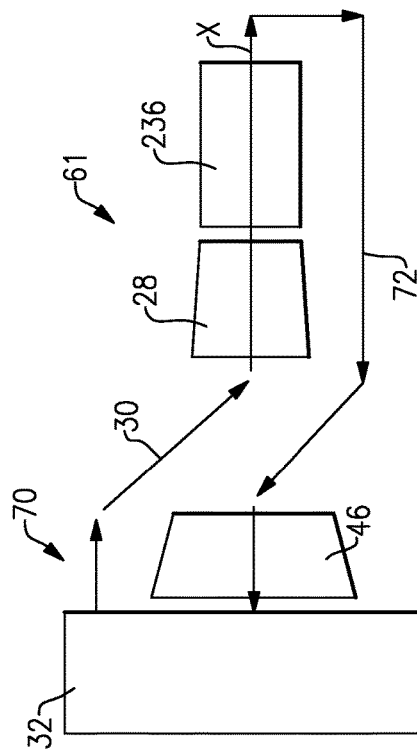
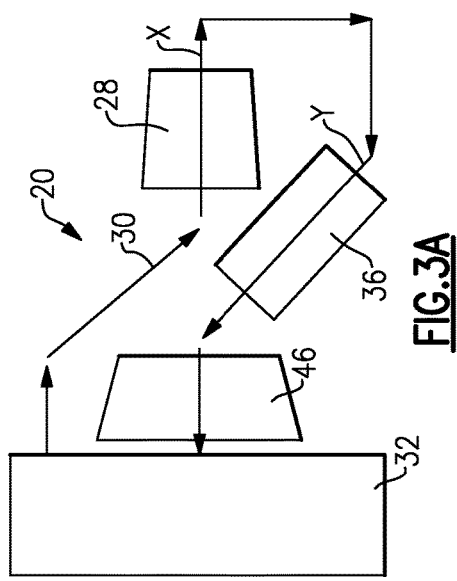
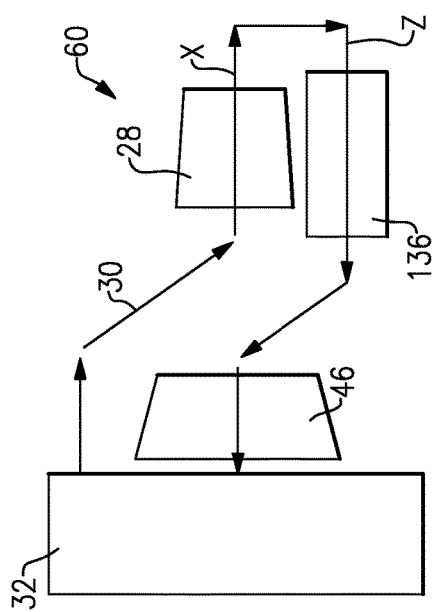

REVERSE FLOW SINGLE SPOOL CORE GAS TURBINE ENGINE

CROSS-REFERENCE TO RELATED APPLICATION

This application claims priority to U.S. Provisional Patent Application No. 61/979,552, filed Apr. 15, 2014.

BACKGROUND OF THE INVENTION

This application relates to a reverse flow gas turbine engine wherein improvements are made for packaging.

Gas turbine engines are known and, typically, include a fan delivering air into a compressor where it is mixed with fuel and ignited. Products of this combustion pass downstream over turbine rotors, driving them to rotate.

Typically, gas turbine engines have arranged the components in that axial order; namely, the fan, the compressor rotors, the combustor, and then the turbine rotors.

More recently, reverse flow engines have been proposed wherein the compressor rotors are axially spaced further into the engine than the combustor or turbine rotors. There are packaging benefits from this arrangement.

However, and particularly, when applied to certain aircraft arrangements, there are still too many packaging restrictions.

SUMMARY OF THE INVENTION

In a featured embodiment, a gas turbine engine comprises a bypass housing receiving a fan and defining an axially front end. An airflow path downstream of the fan delivering air into an inlet duct over a limited circumferential extent of the bypass housing, and an airflow path downstream of the inlet duct passing across a low pressure compressor rotor. An airflow path downstream of the low pressure compressor rotor passes through a core engine, which includes a high pressure compressor rotor, a combustor, and a high pressure turbine rotor. Products of combustion downstream of the high pressure turbine rotor pass into an intermediate duct and then across a low pressure turbine rotor. The low pressure turbine rotor is positioned closer to the front end of the engine than is the high pressure turbine rotor. The low pressure turbine rotor is positioned axially intermediate the low pressure compressor rotor and the fan. The low pressure turbine rotor drives both the fan and the low pressure turbine rotor.

In another embodiment according to the previous embodiment, the low pressure turbine rotor drives a shaft which, in turn, drives the fan through a gear reduction.

In another embodiment according to any of the previous embodiments, the core engine rotates about a first axis. The low pressure turbine rotor rotates about a second axis, with first and second axes being non-parallel.

In another embodiment according to any of the previous embodiments, the core engine rotates about a first axis and the low pressure turbine rotor rotates about a second axis. The first and second axes are parallel, but spaced from each other.

In another embodiment according to any of the previous embodiments, the core engine rotates about a first axis and the low pressure turbine rotor rotates about a second axis. The first and second axes are co-axial.

In another embodiment according to any of the previous embodiments, an airflow path downstream of the low pressure compressor rotor passes axially further into the engine and into the high pressure compressor rotor. Products of combustion downstream of the high pressure turbine rotor are turned back in a direction toward the axial outer end of the engine before reaching the low pressure turbine rotor.

In another embodiment according to any of the previous embodiments, the low pressure turbine drives a shaft, which extends through the intermediate duct, and through the inlet duct to drive the low pressure compressor from the low pressure turbine rotor.

In another embodiment according to any of the previous embodiments, there is an exhaust duct downstream of the low pressure turbine rotor. The exhaust duct delivers products of combustion to mix with bypass air from the bypass duct.

In another embodiment according to any of the previous embodiments, an airflow path downstream of the low pressure compressor turns into a direction heading axially back toward the front end of the engine before reaching the high pressure compressor rotor.

In another embodiment according to any of the previous embodiments, an airflow path downstream of the low pressure compressor rotor passes axially further into the engine and into the high pressure compressor rotor. Products of combustion downstream of the high pressure turbine rotor are turned back in a direction toward the axial outer end of the engine before reaching the low pressure turbine rotor.

In another featured embodiment, an aircraft comprises a pair of gas turbine engines in a tail area. The gas turbine engines have a bypass housing receiving a fan and defining an axially front end. An airflow path downstream of the fan delivers air into an inlet duct over a limited circumferential extent of the bypass housing. An airflow path downstream of the inlet duct passes across a low pressure compressor rotor. An airflow path downstream of the low pressure compressor rotor passes through a core engine, which includes a high pressure compressor rotor, a combustor, and a high pressure turbine rotor. Products of combustion downstream of the high pressure turbine rotor pass into an intermediate duct and then across a low pressure turbine rotor. The low pressure turbine rotor is positioned closer to the front end of the engine than is the high pressure turbine rotor. The low pressure turbine rotor is positioned axially intermediate the low pressure compressor rotor and the fan. The low pressure turbine rotor drives both the fan and the low pressure turbine rotor.

In another embodiment according to the previous embodiment, the low pressure turbine rotor driving a shaft which, in turn, drives the fan through a gear reduction.

In another embodiment according to any of the previous embodiments, the core engine rotates about a first axis. The low pressure turbine rotor rotates about a second axis, with the first and second axes being non-parallel.

In another embodiment according to any of the previous embodiments, the core engine rotates about a first axis. The low pressure turbine rotor rotates about a second axis with the first and second axes being parallel, but spaced from each other.

In another embodiment according to any of the previous embodiments, the core engine rotates about a first axis and the low pressure turbine rotor rotates about a second axis with the first and second axes being co-axial.

In another embodiment according to any of the previous embodiments, an airflow path downstream of the low pressure compressor rotor passes axially further into the engine and into the high pressure compressor rotor. Products of combustion downstream of the high pressure turbine rotor are turned back in a direction toward the axial outer end of the engine before reaching the low pressure turbine rotor.

In another embodiment according to any of the previous embodiments, the low pressure turbine drives a shaft, which extends through the intermediate duct, and through the inlet duct to drive the low pressure compressor from the low pressure turbine rotor.

In another embodiment according to any of the previous embodiments, there is an exhaust duct downstream of the low pressure turbine rotor. The exhaust duct delivers products of combustion to mix with bypass air from the bypass duct.

In another embodiment according to any of the previous embodiments, an airflow path downstream of the low pressure compressor turns into a direction heading axially back toward the front end of the engine before reaching the high pressure compressor rotor.

In another embodiment according to any of the previous embodiments, an airflow path downstream of the low pressure compressor rotor passes axially further into the engine and into the high pressure compressor rotor. Products of combustion downstream of the high pressure turbine rotor are turned back in a direction toward the axial outer end of the engine before reaching the low pressure turbine rotor.

In another embodiment according to any of the previous embodiments, an exhaust nozzle downstream of the exhaust duct accelerates the mixed products of combustion and bypass air to produce thrust.

These and other features may be best understood from the following drawings and specification.

BRIEF DESCRIPTION OF THE DRAWINGS

FIG. 3A shows a first possible arrangement.
FIG. 3B shows a second arrangement.
FIG. 3C shows yet another arrangement.

DETAILED DESCRIPTION

Figure 1:
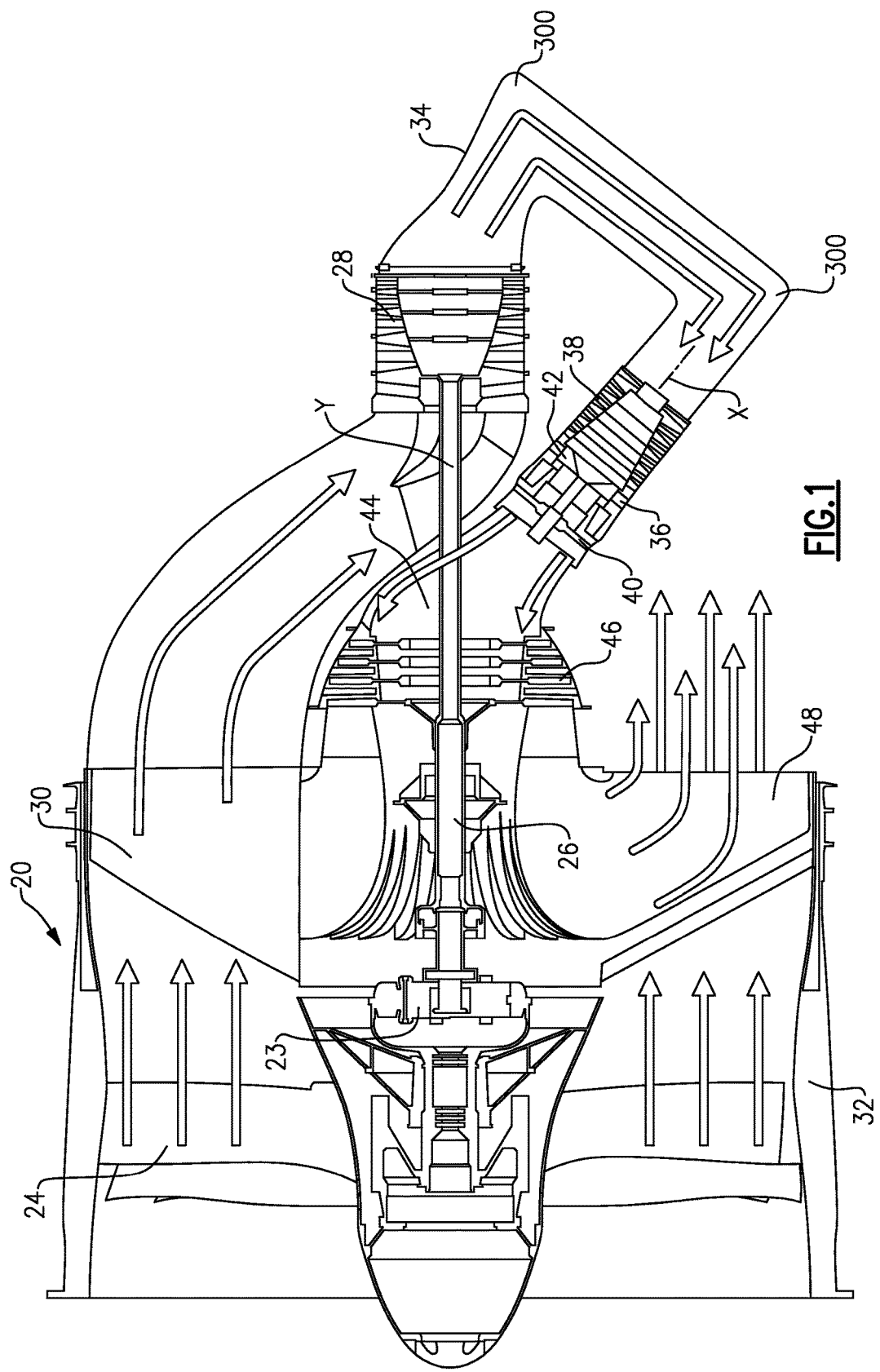
FIG. 1 shows a gas turbine engine.

An engine 20 is illustrated in FIG. 1 having a fan 24 mounted within a bypass housing 32. The fan rotor 24 is driven by a shaft 26 through a gear reduction 23. Air delivered by the fan 24 has a portion delivered into an inlet duct 30 leading to a low pressure compressor 28. The bulk of the air moved downstream by fan 24 passes through the housing 32 and outwardly as propulsion air.

The air delivered into duct 30 passes across the compressor rotor 28 and is compressed and delivered into a duct 34. Vanes may be placed at the corners 300 of duct 34 to reduce losses while turning. The air passes downstream across a high spool, or core engine, 36 that includes a high pressure compressor 38, a combustion section 42, and a high pressure turbine 40.

Products of combustion downstream of the high pressure turbine 40 pass into a duct 44 and then across a turbine 46. As can be seen, turbine 46 drives the shaft 26 and, thus, the fan rotor 24 and compressor rotor 28.

The products of combustion downstream of the turbine rotor 46 pass into an exit duct 48 and mix with the bypass air.

As can be appreciated, the core engine 36 rotates about an axis x while the shaft 26 rotates about an axis y. The axes y and x are not parallel nor perpendicular to each other in this embodiment.

By having a turbine 46 downstream of the turbine 40, which drives both the compressor rotor 28 and the fan 24, a designer is able to achieve packaging benefits. As can be appreciated, the compressor rotor 28 is axially further into the engine than is its driving turbine 46. Further, the turbine 46 is intermediate the low pressure compressor rotor 28 and the fan rotor 36, in a direction extending axially into the engine.

Figure 2A:
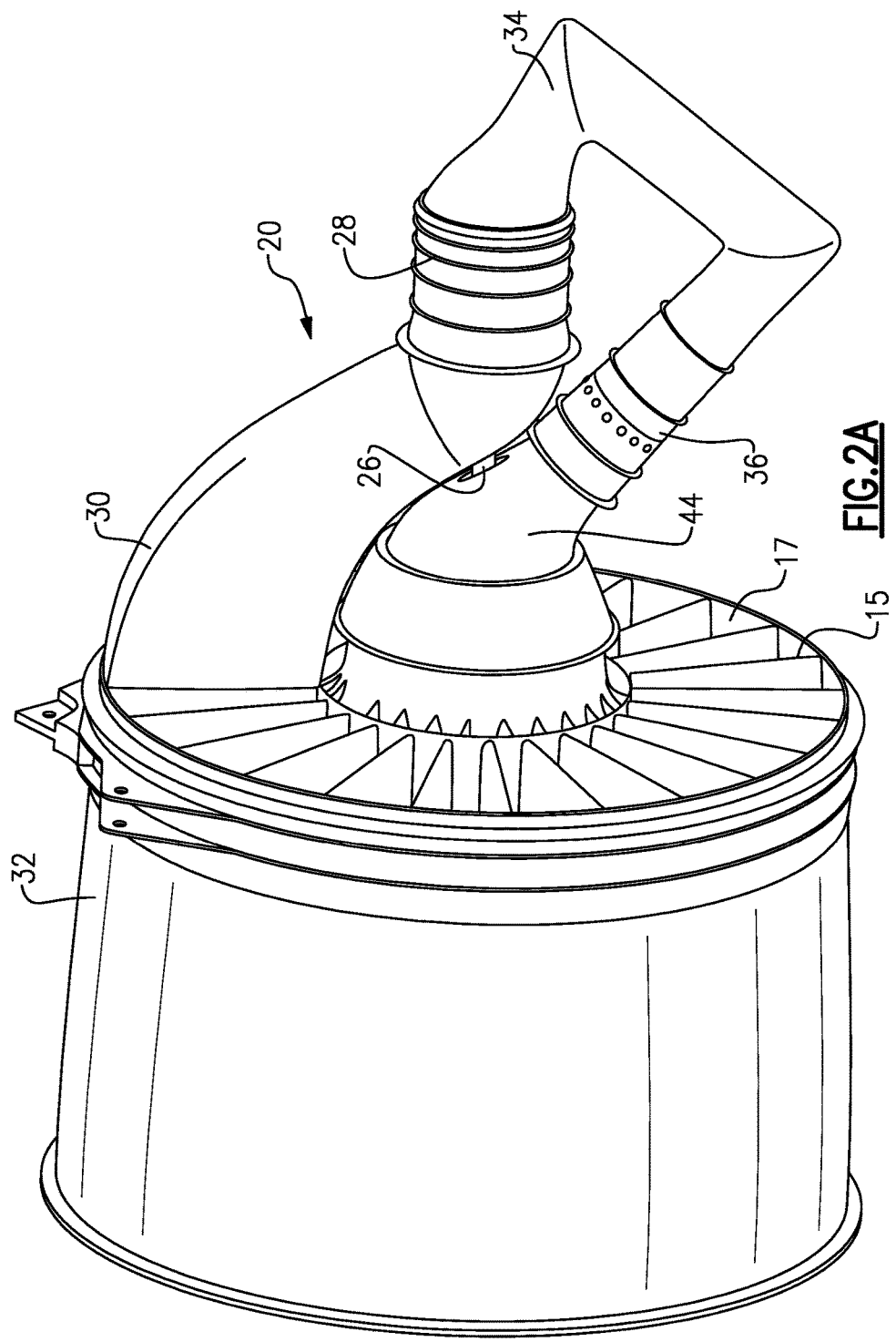
FIG. 2A shows an outside view of the engine.

As shown in FIG. 2A, the engine 20 has the duct 30 over a limited circumference. The fan rotor 24 (see FIG. 1), thus, delivers bypass air through the great bulk of the circumferential extent of the bypass housing 32. The shaft 26 can be seen extending between the duct 44 and the duct 30.

As can be appreciated, by reviewing both FIGS. 1 and 2A, an exhaust nozzle 17 is provided across the circumference of the bypass housing 32, and combines the exhaust from the exit duct 48 along with the bypass air, to accelerate and mix products of combustion with the bypass air to produce thrust. Notably, vanes 15 may be included in the bypass housing 32 to control this downstream flow.

Figure 2B:
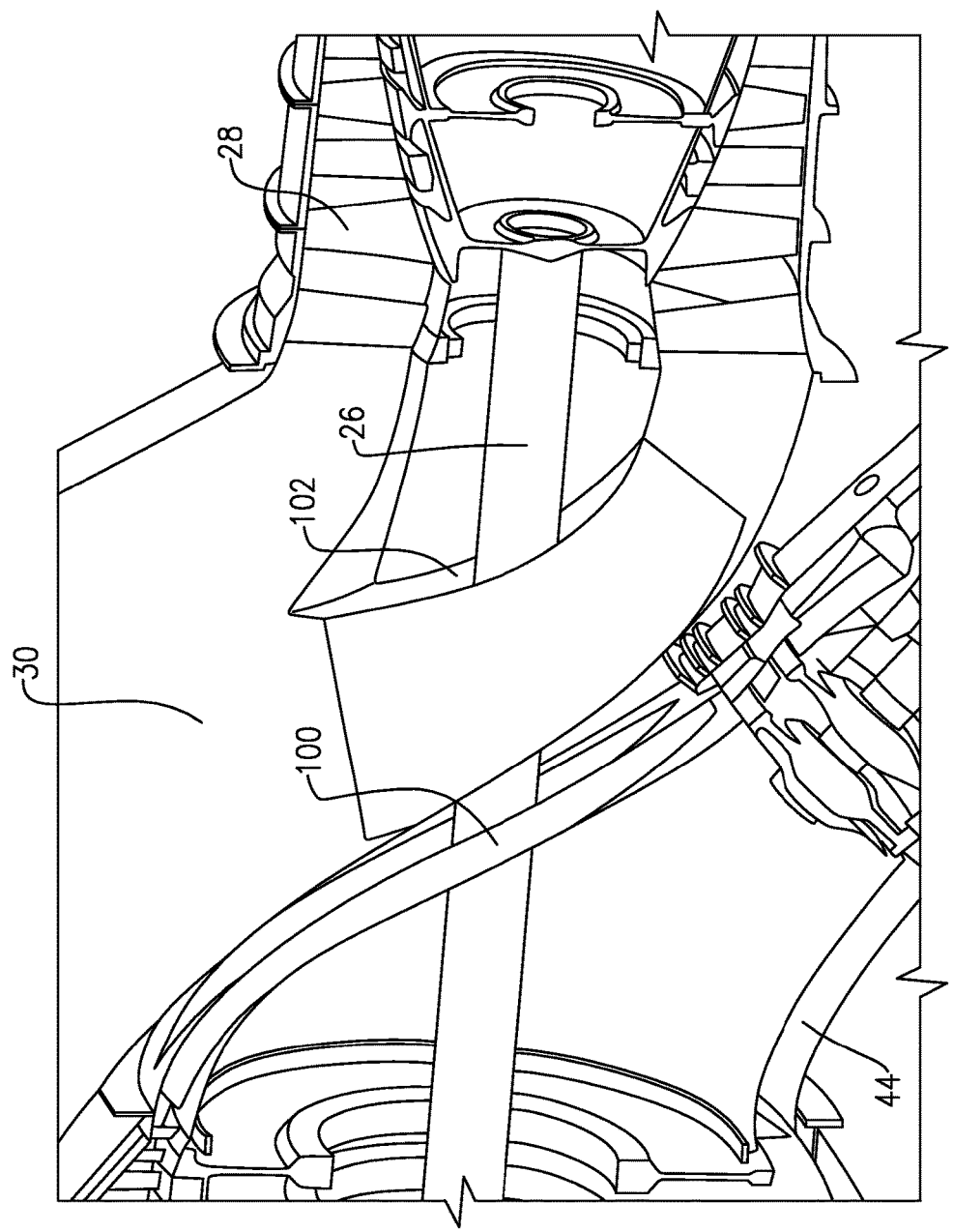
FIG. 2B shows a detail.

FIG. 2B shows a detail, wherein the duct 44 has a strut 100 through which the shaft 26 can pass. Similarly, the duct 30 has a strut 102.

FIG. 3A shows a first engine arrangement, which is essentially that of the engine 20. As can be seen, the axes x and y are non-parallel and non-perpendicular.

FIG. 3B shows an alternative embodiment engine 60, wherein the core engine 136 rotates about an axis z, which is parallel to the axis x of rotation for the compressor rotor 28.

In both embodiments of FIGS. 3A and 3B, an airflow path downstream of the low pressure compressor 28 turns into a direction heading axially back toward a front end of the engine before reaching the high pressure compressor rotor in the core engines 36/136.

FIG. 3C show an embodiment 61, wherein the core engine 236 and the compressor rotor 28 rotate on a common axis x.

In this embodiment, the airflow path downstream of the low pressure compressor rotor 28 passes axially further into the engine and into the high pressure compressor rotor. Products of combustion downstream of the high pressure turbine rotor in core engine 236 are turned back in a direction toward an axial front end of the engine before reaching the low pressure turbine rotor 46.

Figure 4:
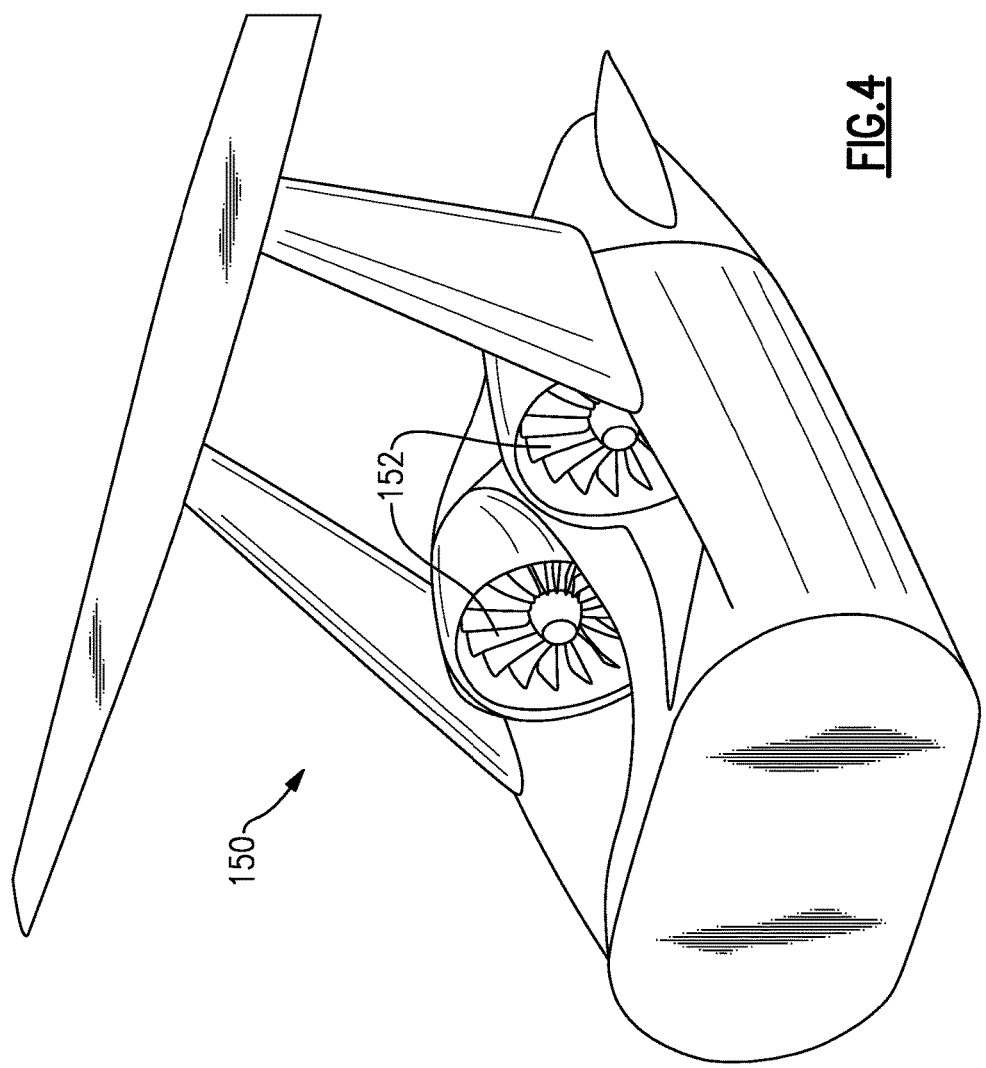
FIG. 4 shows one aircraft application that may benefit from this engine.

FIG. 4 shows an aircraft 150, which is envisioned for the future, having "double bubble" engines 152 mounted in its tail. Such engines will face extreme packaging constraints and the engines disclosed in this application will be particularly well-suited for meeting those challenges.

In summary, a bypass housing 32 receives a fan 24, and defines an axially front end of an engine. An airflow path downstream of the fan 24 delivers air into an inlet duct 30 over a limited circumferential extent of the bypass housing. An airflow path downstream of the inlet duct 30 passes across a low pressure compressor rotor 28. An airflow path downstream of the low pressure compressor rotor 28 passes through a core engine 36/136/236. The core engine 36/136/236 includes a high pressure compressor rotor 38, a combustor, and a high pressure turbine rotor 40. Products of combustion downstream of the high pressure turbine rotor 40 passes into an intermediate duct 44 and then across a low pressure turbine rotor 26. The low pressure turbine rotor 26 is positioned closer to the front end of the engine than is the high pressure turbine rotor 40. The low pressure turbine rotor 26 is positioned axially intermediate the low pressure compressor rotor 28 and the fan 24. The low pressure turbine rotor 26 drives both the fan and the low pressure turbine rotor 26.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a bypass housing receiving and circumscribing blades of a fan, and defining an axially front end, an airflow path downstream of said fan delivering air into an inlet duct of a low pressure compressor rotor over a limited circumferential extent of the bypass housing, an airflow path downstream of the inlet duct passing across the low pressure compressor rotor;
   an airflow path downstream of said low pressure compressor rotor passing through a core engine, said core engine including a high pressure compressor rotor, a combustor, and a high pressure turbine rotor;
   products of combustion downstream of the high pressure turbine rotor passing into an intermediate duct and then across a low pressure turbine rotor, with said low pressure turbine rotor being positioned closer to said front end of said engine than is said high pressure turbine rotor; and
   said low pressure turbine rotor positioned axially intermediate said low pressure compressor rotor and said fan, and said low pressure turbine rotor driving both said fan and said low pressure compressor rotor, and wherein the inlet duct of the low pressure compressor rotor extends in a radial direction to at least a portion of an inner surface of the bypass housing at a location radially outward of the fan blades.

2. The gas turbine engine as set forth in claim 1, wherein said low pressure turbine rotor driving a shaft which, in turn, drives said fan through a gear reduction.

3. The gas turbine engine as set forth in claim 1, wherein said core engine rotates about a first axis, and said low pressure turbine rotor rotates about a second axis, with first and second axes being non-parallel.

4. The gas turbine engine as set forth in claim 1, wherein said core engine rotates about a first axis and said low pressure turbine rotor rotates about a second axis with said first and second axes being parallel, but spaced from each other.

5. The gas turbine engine as set forth in claim 1, wherein said core engine rotating about a first axis and said low pressure turbine rotor rotating about a second axis with said first and second axes being co-axial.

6. The gas turbine engine as set forth in claim 5, wherein an airflow path downstream of said low pressure compressor rotor passing axially further into said engine and into said high pressure compressor rotor, and products of combustion downstream of the high pressure turbine rotor being turned back in a direction toward said axial front end of said engine before reaching said low pressure turbine rotor.

7. The gas turbine engine as set forth in claim 1, wherein said low pressure turbine driving a shaft, with said shaft extending through said intermediate duct, and through said inlet duct to drive said low pressure compressor from said low pressure turbine rotor.

8. The gas turbine engine as set forth in claim 1, wherein there being an exhaust duct downstream of said low pressure turbine rotor, with said exhaust duct delivering products of combustion to mix with bypass air from the bypass duct.

9. The gas turbine engine as set forth in claim 1, wherein an airflow path downstream of said low pressure compressor turns into a direction heading axially back toward said front end of said engine before reaching said high pressure compressor rotor.

10. The gas turbine engine as set forth in claim 1, wherein an airflow path downstream of said low pressure compressor rotor passing axially further into said engine and into said high pressure compressor rotor, and products of combustion downstream of the high pressure turbine rotor being turned back in a direction toward said axial front end of said engine before reaching said low pressure turbine rotor.

11. An aircraft comprising:
    a pair of gas turbine engines in a tail area; and
    the gas turbine engines having a bypass housing receiving and circumscribing blades of a fan, and defining an axially front end, an airflow path downstream of said fan delivering air into an inlet duct of a low pressure compressor rotor over a limited circumferential extent of the bypass housing, an airflow path downstream of the inlet duct passing across the low pressure compressor rotor, an airflow path downstream of said low pressure compressor rotor passing through a core engine, said core engine including a high pressure compressor rotor, a combustor, and a high pressure turbine rotor, products of combustion downstream of the high pressure turbine rotor passing into an intermediate duct and then across a low pressure turbine rotor, with said low pressure turbine rotor being positioned closer to said front end of said engine than is said high pressure turbine rotor, said low pressure turbine rotor positioned axially intermediate said low pressure compressor rotor and said fan, and said low pressure turbine rotor driving both said fan and said low pressure compressor rotor, and wherein the inlet duct of the low pressure compressor rotor extends in a radial direction to at least a portion of an inner surface of the bypass housing at a location radially outward of the fan blades.

12. The aircraft as set forth in claim 11, wherein said low pressure turbine rotor driving a shaft which, in turn, drives said fan through a gear reduction.

13. The aircraft as set forth in claim 11, wherein said core engine rotates about a first axis, and said low pressure turbine rotor rotates about a second axis, with said first and second axes being non-parallel.

14. The aircraft as set forth in claim 11, wherein said core engine rotates about a first axis and said low pressure turbine rotor rotates about a second axis with said first and second axes being parallel, but spaced from each other.

15. The aircraft as set forth in claim 11, wherein said core engine rotating about a first axis and said low pressure turbine rotor rotating about a second axis with said first and second axes being co-axial.

16. The aircraft as set forth in claim 15, wherein an airflow path downstream of said low pressure compressor rotor passing axially further into said engine and into said high pressure compressor rotor, and products of combustion downstream of the high pressure turbine rotor being turned back in a direction toward said axial front end of said engine before reaching said low pressure turbine rotor.

17. The aircraft as set forth in claim 11, wherein said low pressure turbine driving a shaft, with said shaft extending through said intermediate duct, and through said inlet duct to drive said low pressure compressor from said low pressure turbine rotor.

18. The aircraft as set forth in claim 11, wherein there being an exhaust duct downstream of said low pressure turbine rotor, with said exhaust duct delivering products of combustion to mix with bypass air from the bypass duct.

19. The aircraft as set forth in claim 11, wherein an airflow path downstream of said low pressure compressor turns into a direction heading axially back toward said front end of said engine before reaching said high pressure compressor rotor.

20. The aircraft as set forth in claim 11, wherein an airflow path downstream of said low pressure compressor rotor passing axially further into said engine and into said high pressure compressor rotor, and products of combustion downstream of the high pressure turbine rotor being turned back in a direction toward said axial front end of said engine before reaching said low pressure turbine rotor.

21. The aircraft as set forth in claim 11, wherein there is an exhaust nozzle downstream of said exhaust duct, with said exhaust nozzle accelerating the mixed products of combustion and bypass air to produce thrust.

\* \* \* \* \*